US012711784B2

(12) United States Patent
Nagaoka

(10) Patent No.: US 12,711,784 B2
(45) Date of Patent: Aug. 18, 2026

(54) VANISHING POINT CALCULATOR

(71) Applicant: TOYOTA JIDOSHA KABUSHIKI KAISHA, Toyota (JP)

(72) Inventor: Kohtaroh Nagaoka, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 371 days.

(21) Appl. No.: 18/242,572

(22) Filed: Sep. 6, 2023

(65) Prior Publication Data

US 2024/0087336 A1 Mar. 14, 2024

(30) Foreign Application Priority Data

Sep. 13, 2022 (JP) ................................ 2022-145271

(51) Int. Cl.
*G06V 10/44* (2022.01)
*G06T 7/13* (2017.01)
*G06V 20/56* (2022.01)

(52) U.S. Cl.
CPC .............. *G06V 20/588* (2022.01); *G06T 7/13* (2017.01); *G06V 10/44* (2022.01); *G06V 2201/07* (2022.01)

(58) Field of Classification Search
CPC ........ G06T 7/13; G06V 10/44; G06V 20/588; G06V 2201/07
See application file for complete search history.

(56) References Cited

U.S. PATENT DOCUMENTS

2003/0016287 A1 1/2003 Nakayama et al.
2009/0085913 A1 4/2009 Sakamoto et al.
2015/0227800 A1* 8/2015 Takemae ................ E01F 11/00 382/104
2017/0103546 A1* 4/2017 Wang ...................... B60R 11/04
2017/0147892 A1* 5/2017 Ishii ...................... G06T 3/4038
2018/0086284 A1* 3/2018 Gupta ..................... B60R 11/04
2020/0125859 A1 4/2020 Sagong et al.

FOREIGN PATENT DOCUMENTS

JP 2008-225784 A 9/2008
JP 2009-075938 A 4/2009
JP 2020-064056 A 4/2020

* cited by examiner

*Primary Examiner* — Jessica M Prince
(74) *Attorney, Agent, or Firm* — Dinsmore & Shohl LLP

(57) ABSTRACT

A vanishing point calculator includes a controller connected to an imaging device configured to image in a vehicle traveling direction; and a storage device connected to the controller, wherein the controller is configured to: input an image imaged by the imaging device; extract positions of feature points from the image; store the positions of feature points related to a stationary object including a line segment parallel to road among the extracted feature points in the storage device for each image; overlap the feature points in a predetermined number of the images stored in the storage device based on the positions of the feature points; and calculate the position of vanishing point in the image imaged by the imaging device based on a line segment obtained by the overlapped feature points.

1 Claim, 6 Drawing Sheets

2
VEHICLE
3
IMAGING DEVICE
1
10
VANISHING POINT CALCULATION ECU
11
IMAGE PROCESSING UNIT
12
FEATURE POINTS STORAGE UNIT
13
OVERLAPPING UNIT
14
VANISHING POINT CALCULATION UNIT
4
VEHICLE ATTITUDE ESTIMATION ECU
122
STORAGE DEVICE

G1
L10
L11
L12

GH1
H1
H2

G1
G2
G3
G4
G5
G6
L13

GHn
H1
H2

VANISHING POINT CALCULATOR

CROSS-REFERENCE TO RELATED APPLICATION

This application is based on Japanese Patent Application No. 2022-145271 filed with Japan Patent Office on Sep. 13, 2022, the entire contents of which are hereby incorporated by reference.

TECHNICAL FIELD

The present disclosure relates to a vanishing point calculator.

BACKGROUND

Japanese Patent Application Publication No. 2008-225784 discloses an apparatus for calculating a position of a vanishing point in an image obtained by imaging in a vehicle traveling direction. This device extracts a line segment parallel to road such as a partition line from the image, and calculates the position of the vanishing point in the image based on the line segment.

SUMMARY

The device described in Japanese Patent Application Publication No. 2008-225784 may not be able to sufficiently extract feature points of line segments parallel to road, such as partition lines, from the image. For example, in a case where the partition line is blurred or a part of the partition line is hidden by obstacles, the number of feature points obtained from the image decreases, and there is a concern that the line segment for calculating the position of the vanishing point may not be generated with high accuracy. The present disclosure provides a technique for suppressing a decrease in accuracy of the position of the vanishing point due to an insufficient number of feature points.

A vanishing point calculator according to one aspect of the present disclosure includes a controller connected to an imaging device configured to image in a vehicle traveling direction, and a storage device connected to the controller. The controller inputs an image imaged by the imaging device, extracts positions of feature points from the image, stores the positions of feature points related to a stationary object including a line segment parallel to a road among the extracted feature points in the storage device for each image, overlaps the feature points in a predetermined number of images stored in the storage device based on the positions of feature points, and calculates a position of a vanishing point of the image imaged by the imaging device based on a line segment obtained by the overlapped feature points.

According to the vanishing point calculator, the positions of feature points are stored in the storage device for each image. The feature points in the predetermined number of images stored in the storage device are overlapped based on the positions of the feature points. Then, based on a line segment obtained by the overlapped feature points, a position of a vanishing point of the image imaged by the imaging device is calculated. In this manner, when there is the stationary object including the line segment parallel to the road (for example, a structure including a lane marking, a road stud, or the like), the line continues to appear at the same position between consecutive images. The vanishing point calculator stores the positions of the feature points over a plurality of images and overlaps the feature points on each other, so that it is possible to suppress a decrease in the accuracy of the vanishing point due to an insufficient number of feature points.

The controller may obtain edge strength as the feature points, acquire a local maximum point of the edge strength as a rising edge point, acquire a local minimum point of the edge strength as a falling edge point, store a position of the rising edge point and a position of the falling edge point in the storage device for each image, overlaps the rising edge points based on the positions of the rising edge points and overlaps the falling edge points based on the positions of the falling edge points, in a predetermined number of images stored in the storage device.

In this case, the vanishing point calculator can obtain a straight line related to the rising edge points from the set of rising edge points and can obtain a straight line related to the falling edge points from the set of falling edge points. As a result, the vanishing point calculator can reduce the accuracy of extraction regarding the straight lines and the time required for calculation of extraction regarding the straight lines.

According to the present disclosure, there is provided a technique capable of suppressing a decrease in the accuracy of the position of the vanishing point due to an insufficient number of feature points.

DETAILED DESCRIPTION

Hereinafter, embodiments of the present disclosure will be described with reference to the drawings.

Figure 1:
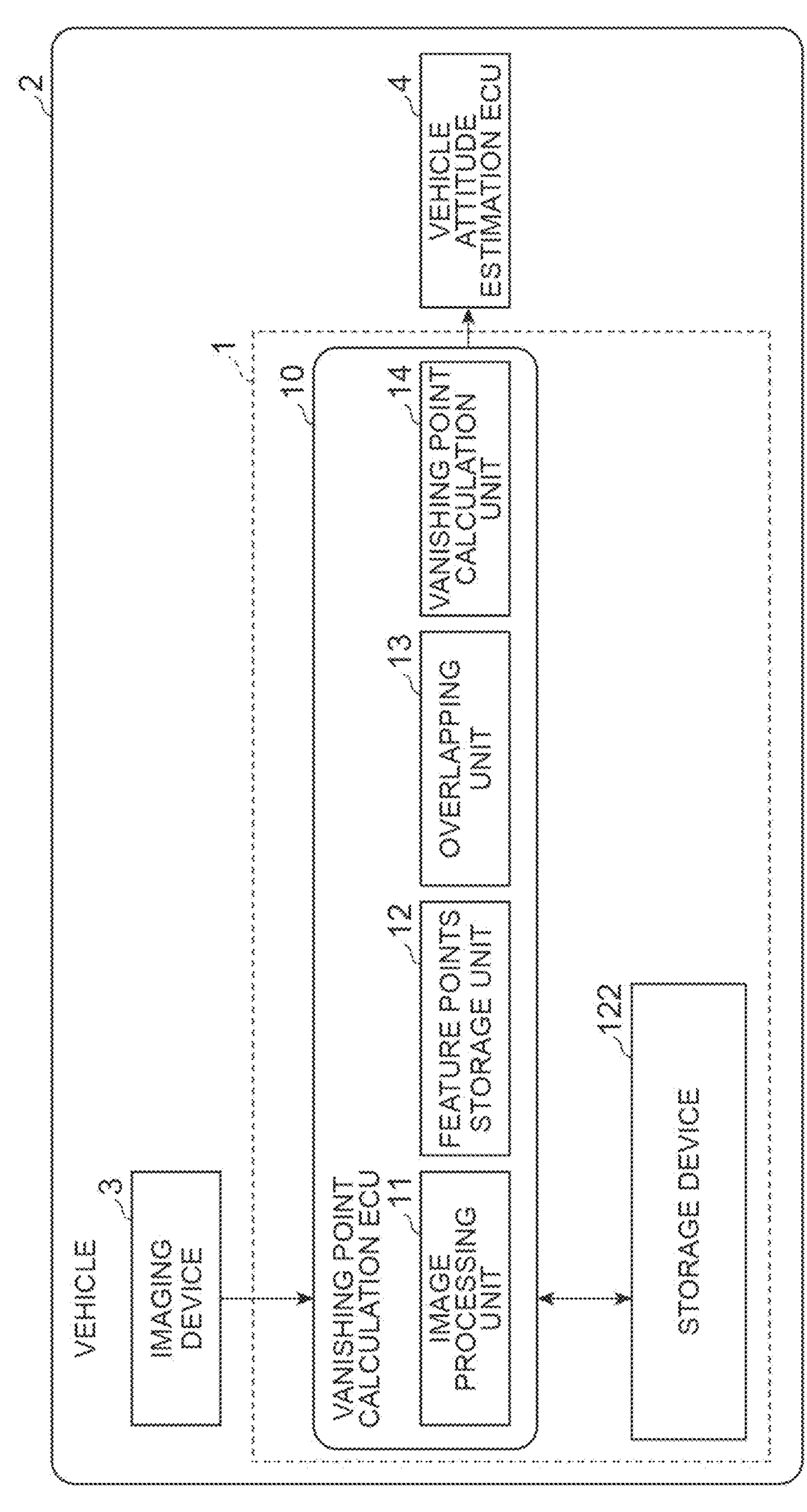
FIG. 1 is a block diagram illustrating an example of a configuration of a vehicle including a vanishing point calculator according to an embodiment.

FIG. 1 is a block diagram illustrating an example of a configuration of a vehicle including a vanishing point calculator according to an embodiment. As shown in FIG. 1, a vanishing point calculator 1 is mounted on a vehicle 2 as an example. The vehicle 2 is, for example, an autonomous driving vehicle running in autonomous driving.

As an example, the vehicle 2 includes an imaging device 3 and a vehicle attitude estimation electronic control unit (ECU) 4 in addition to the vanishing point calculator 1. The ECU is an electronic control unit including a central processing unit (CPU), a read only memory (ROM), a random-access memory (RAM), a controller area network (CAN) communication circuit, and the like.

The imaging device 3 images in the direction of travel of the vehicle 2 and generates an image. In the image, a stationary object having a line segment parallel to the running road is drawn. The stationary object is, for example, a lane marking (lane boundary line or the like) or a structure. The vanishing point calculator 1 is connected to the imaging device 3 and calculates the vanishing point of the image imagined by the imaging device 3. A vehicle attitude estimation ECU 4 estimates the attitude of the vehicle 2 based on the vanishing point calculated by the vanishing point calculator 1.

The vanishing point calculator 1 includes a vanishing point calculation ECU 10 (an example of a controller). Based on a signal output from the CPU, the vanishing point calculation ECU 10 operates the CAN communication circuit to input and output data, stores data in the RAM, loads a program stored in the ROM into the RAM, and executes the program loaded into the RAM, thereby realizing functions described later. The vanishing point calculation ECU 10 may be included of a plurality of electronic control units.

The vanishing point calculation ECU 10 has an image processing unit 11, a feature points storage unit 12, an overlapping unit 13, and a vanishing point calculation unit 14.

The image processing unit 11 extracts feature points used for calculation of vanishing points from an image imaged by the imaging device 3. The feature points are, for example, edge points.

The image processing unit 11 calculates edge strength for each pixel by using a spatial differential filter. Various methods such as a Sobel filter can be applied to the spatial differential filter. The spatial differential filter may be a filter capable of acquiring not only the edge strength but also the luminance gradient direction.

Figure 2:
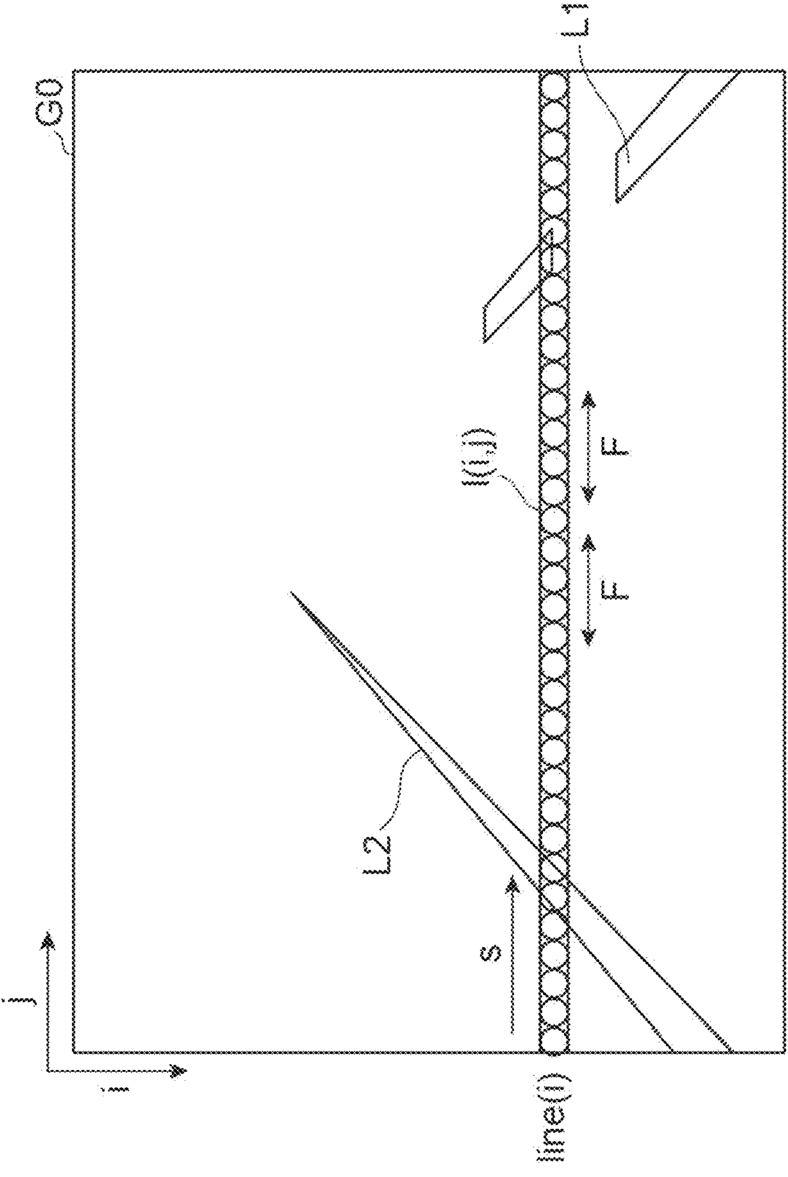
FIG. 2 is a diagram illustrating calculation of the edge strength of the image processing unit.

FIG. 2 is a diagram illustrating calculation of the edge strength of the image processing unit. As shown in FIG. 2, the image processing unit 11 performs line scanning such that a scanning direction S is horizontal with respect to an image G0 in which lane boundary lines L1, L2 are drawn. The image processing unit 11 calculates the edge strength E(i, j) of the target pixel I(i, j) in the processing line indicated by line (i). The spatial differential filter is a one-dimensional differential filter in the horizontal direction. The image processing unit 11 calculates edge strength E(i, j) by the following equation, for example.

$$E(i, j) = -\sum_{k=-F}^{-1} I(t, k) + \sum_{k=1}^{F} I(t, k)$$

Where F is the size of the spatial differentiation filter. The size F of the spatial filter is set as F=max(Fr/Wi, Fmin) using the size Fr in the real space and the size Wi of one pixel in a processing line i in the real space. Fmin is the shortest filter length, where Fmin=2.

Figure 3:
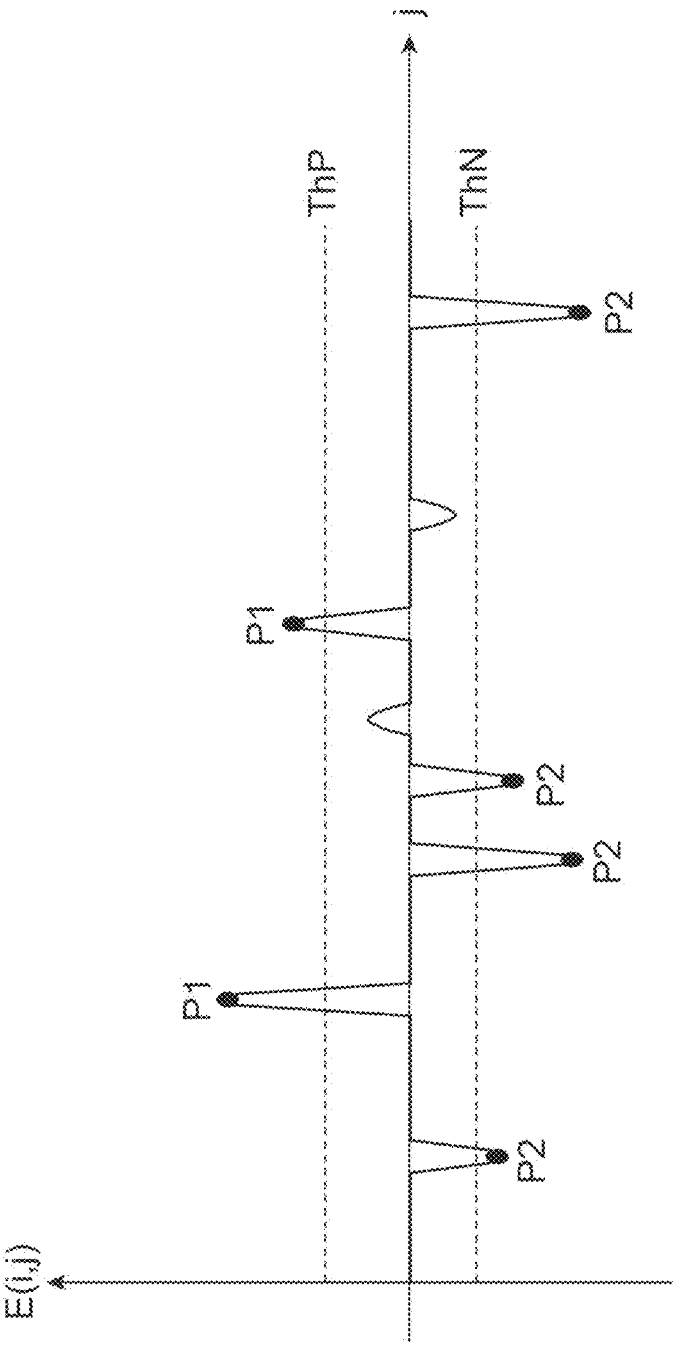
FIG. 3 is a graph showing the relationship between the pixel position and the edge strength.

FIG. 3 is a graph showing the relationship between the pixel position and the edge strength. In the graph shown in FIG. 3, the horizontal axis represents a horizontal position j and the vertical axis represents edge strength E(i, j). As shown in FIG. 3, edge strength E(i, j) for each the horizontal position j is calculated by scanning along the scanning direction S by the image processing unit 11. The image processing unit 11 extracts a local maximum point of edge strength having edge strength equal to or greater than a positive a threshold ThP from edge strength E(i, j) of each pixel as a rising edge point P1, and acquires a position (coordinates) in the rising edge point P1. The image processing unit 11 extracts, as a falling edge point P2, a local minimum point of edge strength having edge strength equal to or less than a negative a threshold ThN among the edge strength of each pixel, and acquires a position (coordinates) in the falling edge point P2. The positive the threshold ThP and the negative the threshold ThN are predetermined.

The feature points storage unit 12 stores the positions of the edge points extracted by the image processing unit 11 in a storage device 122 for each image. The feature points storage unit 12 stores the position of an edge point related to a stationary object including a line segment parallel to road among the extracted edge points. For example, when an edge point overlaps a straight line obtained by the Hough transform, the edge point is determined to be an edge point of a stationary object including a line segment parallel to road. The storage device 122 is, for example, a hard disk drive (HDD). The feature points storage unit 12 may store feature points by distinguishing them not only for each image but also for each type of feature points. For example, the feature points storage unit 12 stores a table storing the positions of the rising edge points and a table storing the positions of the falling edge points separately in the storage device 122.

The overlapping unit 13 overlaps (superimposes) the edge points in a predetermined number of images stored in the storage device 122 based on the positions of the edge points. As a result, the positions of the edge points obtained from the stationary object having a line segment parallel to road become continuous and clear lines. Note that the overlapping unit 13 may superimpose the pixels themselves of the image.

The vanishing point calculation unit 14 derives a straight line based on the overlaid feature points, and calculates a vanishing point.

Figures 4A, 4B, 4C, 4D:
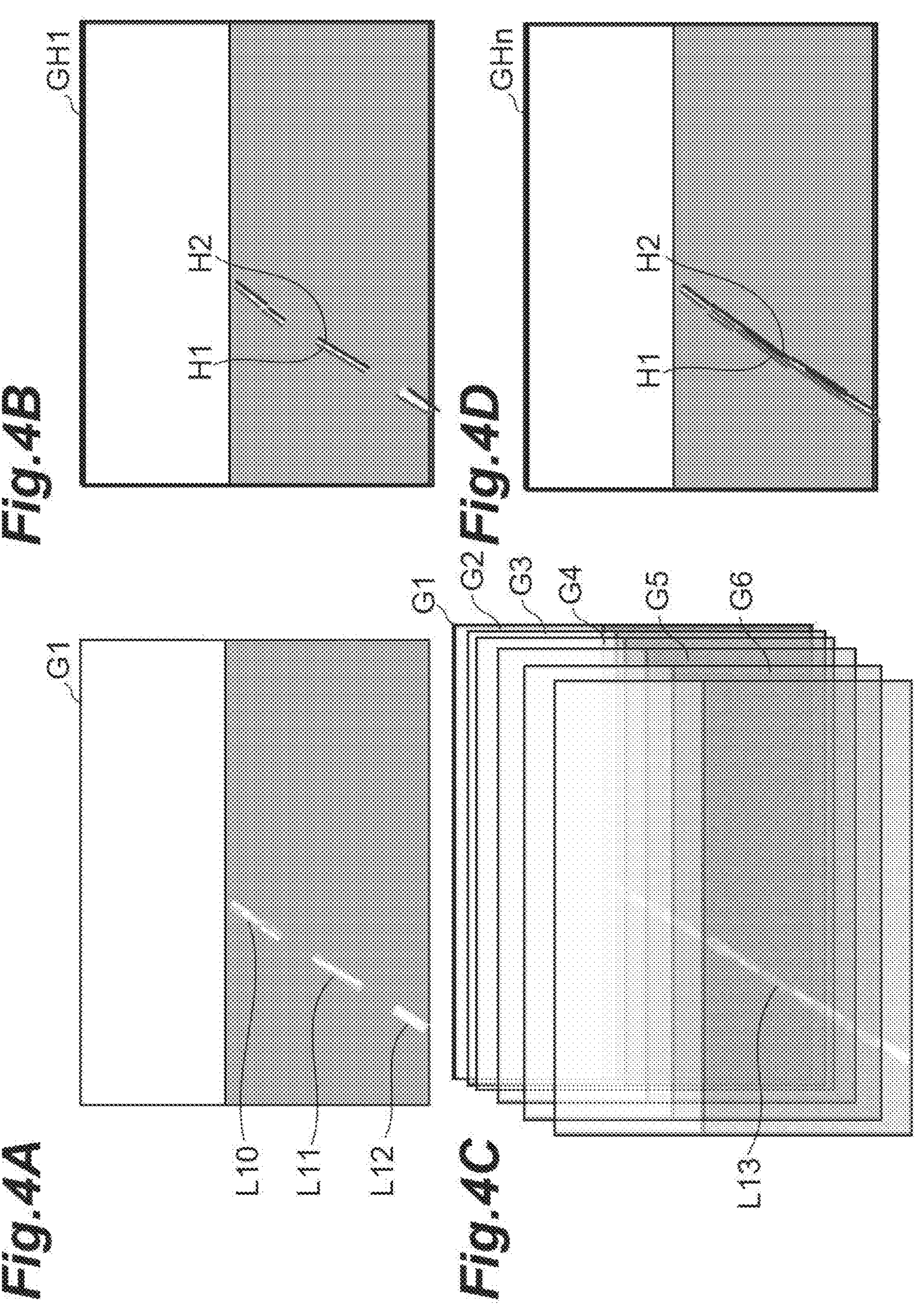
FIG. 4A is an example of one image.
FIG. 4B is an example of extraction of a straight line obtained from feature points of one image
FIG. 4C is an example of overlapping of feature points in a plurality of images.
FIG. 4D is an example of extraction of a straight line obtained from superimposed feature points.

FIG. 4A is an example of one image. In FIG. 4A, lane boundary lines L10, L11, and L12 are drawn. The lane boundary lines L10, L11 are blurred. FIG. 4B is an extraction example GH1 of a straight line obtained from feature points of one image shown in FIG. 4A. Here, a straight line composed of rising edge points is shown as a first straight line H1, and a straight line composed of falling edge points is shown as a second straight line H2. As shown in FIG. 4B, even if the edge information is extracted from one image shown in FIG. 4A and the straight line is formed, it is difficult to form the straight line, or there is a concern that the straight line may be formed at a completely different angle.

FIG. 4C is an example of overlapping of feature points in a plurality of images. Here, feature points in images imaged in time series of images G1 to G6 are overlapped (superimposed). Thus, a synthetic lane boundary L13 is generated. FIG. 4D is an extraction example GH2 of a straight line obtained from feature points in a plurality of images shown in FIG. 4C. Here, a straight line composed of rising edge points is shown as a first straight line H1, and a straight line composed of falling edge points is shown as a second straight line H2. As shown in FIG. 4D, since the synthetic lane boundary L13 shown in FIG. 4C is clearly continuous, the first straight line H1 and the second straight line H2 parallel to each other can be accurately derived.

Figure 5:
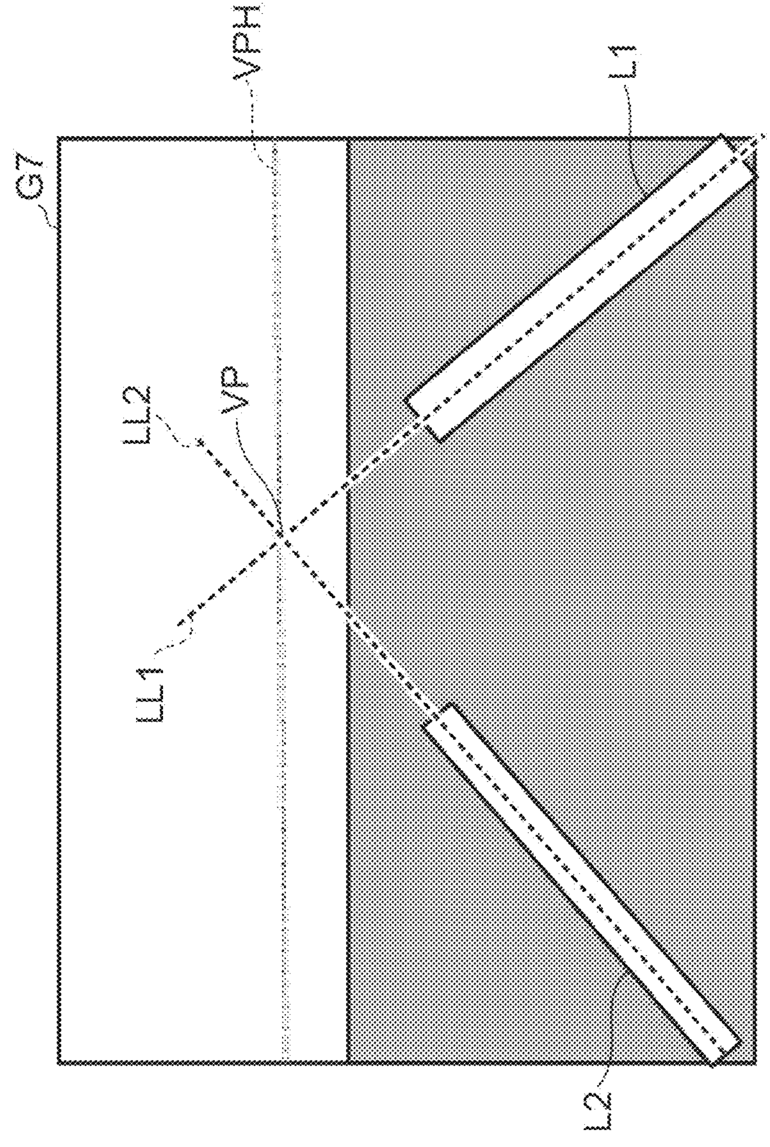
FIG. 5 is a diagram for explaining calculation of a vanishing point.

FIG. 5 is a diagram for explaining calculation of a vanishing point. As shown in FIG. 5, the vanishing point calculation unit 14 derives straight lines LL1, LL2 based on edge points obtained from the right and left the lane boundary lines L1, L2. In the vanishing point calculation unit 14, the intersection of the derived the straight lines LL1, LL2 is a vanishing point VP. The horizontal straight line VPH through the vanishing point VP indicates the height position of the vanishing point VP.

As described above, the vanishing point calculator 1 calculates the vanishing point VP based on the image of the imaging device 3.

Figure 6:
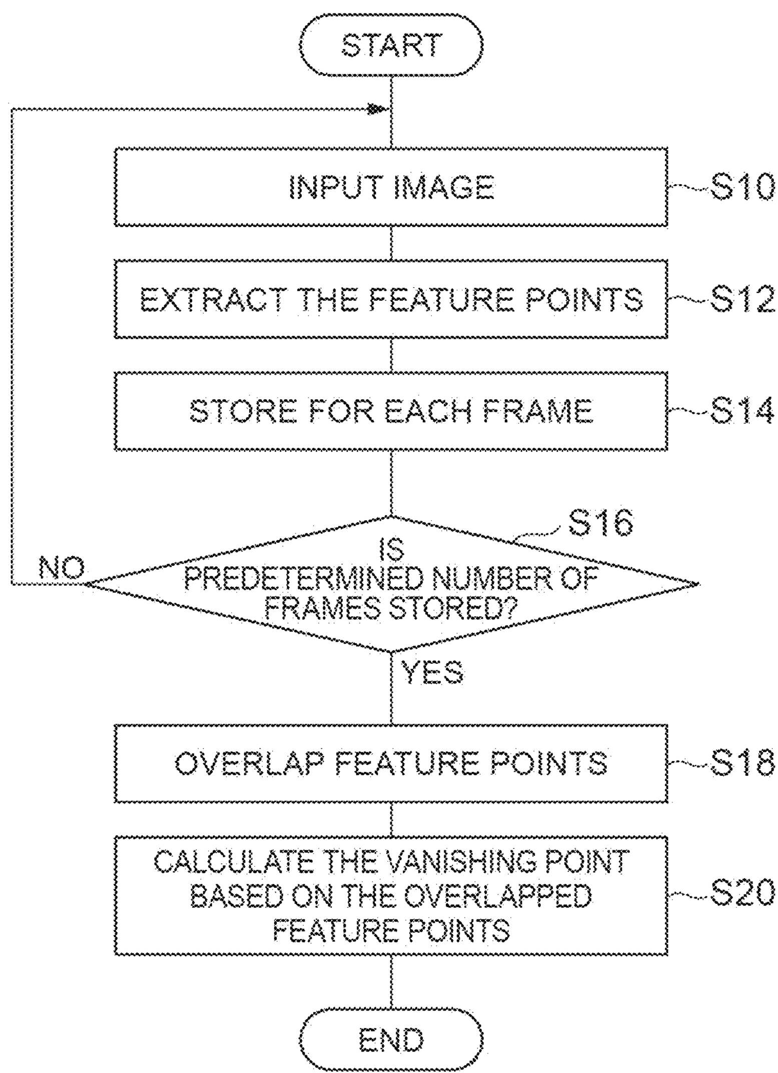
FIG. 6 is a flowchart illustrating an operation of the vanishing point calculator.

The operation of the vanishing point calculator 1 will now be outlined. FIG. 6 is a flowchart illustrating an operation of the vanishing point calculator. The flowchart shown in FIG. 6 is started when the vanishing point calculator 1 receives a start instruction.

As shown in FIG. 6, initially, the image processing unit 11 in the vanishing point calculator 1 inputs an image from the imaging device 3 (step S10). Subsequently, the image processing unit 11 extracts feature points (for example, edge points) from the image (step S12). Subsequently, the feature points storage unit 12 stores the positions of the feature points in the storage device 122 (step S12). Subsequently, the feature points storage unit 12 determines whether or not the positions of the feature points have been stored for a predetermined number of frames (step S14). When it is determined that the positions of the feature points are not stored for the predetermined number of frames (step S16: NO), steps S10 to S14 are repeatedly executed.

When it is determined that the positions of the feature points are stored for the predetermined number of frames (step S16: YES), the overlapping unit 13 in the vanishing point calculator 1 overlaps the edge points in the predetermined number of images stored in the storage device 122 based on the positions of the edge points (step S18). Subsequently, the vanishing point calculation unit 14 of the vanishing point calculator 1 derives straight lines based on the superimposed feature points and calculates vanishing points (step S20). When step S20 ends, the flowchart shown in FIG. 6 ends.

SUMMARY OF EMBODIMENT

According to the vanishing point calculator 1, the positions of the edge points are stored in the storage device 122 for each image. The edge points in the predetermined number of images stored in the storage device 122 are overlapped based on the positions of the edge points. Then, the position of the vanishing point in the image imaged by the imaging device 3 is calculated based on the line segment obtained by the superimposed edge points. In this manner, when there is a stationary object including a line segment parallel to the road (for example, a structure including a lane marking, a road stud, or the like), the line continues to appear at the same position between consecutive images. By storing and superimposing the positions of the edge points over a plurality of images, the vanishing point calculator 1 can suppress a decrease in the accuracy of vanishing points due to an insufficient number of edge points.

In addition, by deriving a straight line related to rising edge points from a set of rising edge points and deriving a straight line related to falling edge points from a set of falling edge points, the vanishing point calculator 1 can reduce the accuracy of extraction regarding straight line and the time required for calculation of extraction regarding straight line.

While exemplary embodiments have been described above, various omissions, substitutions, and changes may be made without being limited to the exemplary embodiments described above. For example, the feature points are not limited to edge points, and may be flow points or points indicating features in which line segments that are stationary objects and parallel to each other exist.

REFERENCE SIGNS LIST

1 . . . vanishing point calculator, 2 . . . vehicle, 3 . . . imaging device, 10 . . . vanishing point calculation ECU, 122 . . . storage device.

What is claimed is:

1. A vanishing point calculator comprising:

a controller connected to an imaging device configured to image in a vehicle traveling direction; and a storage device connected to the controller, wherein the controller is configured to:

input an image imaged by the imaging device;

extract positions of feature points from the image;

store the positions of feature points related to a stationary object including a line segment parallel to a road among the extracted feature points in the storage device for each image;

overlap the feature points in a predetermined number of the images stored in the storage device based on the positions of the feature points;

calculate a position of a vanishing point in the image imaged by the imaging device based on a line segment obtained by the overlapped feature points;

obtain edge strength as the feature points;

acquire a local maximum point of the edge strength as a rising edge point;

acquire a local minimum point of the edge strength as a falling edge point;

store a position of the rising edge point and a position of the falling edge point in the storage device for each image; and overlap the rising edge points based on positions of the rising edge points, and overlap the falling edge points based on positions of the falling edge points, in a predetermined number of images stored in the storage device.

* * * * *